United States Patent
Wojciechowski

(10) Patent No.: US 6,792,745 B2
(45) Date of Patent: Sep. 21, 2004

(54) HIGH BYPASS MULTI-FAN ENGINE

(75) Inventor: Paul M. Wojciechowski, Bothell, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/216,263

(22) Filed: Aug. 9, 2002

(65) Prior Publication Data

US 2004/0025493 A1 Feb. 12, 2004

(51) Int. Cl.$^7$ ................................................ F02K 3/00
(52) U.S. Cl. ........................................ 60/224; 60/226.1
(58) Field of Search ............................ 60/39.15, 224, 60/226.1, 263

(56) References Cited

U.S. PATENT DOCUMENTS

| | | | | |
|---|---|---|---|---|
| 3,054,577 A | * | 6/1962 | Wolf et al. ................ | 60/226.1 |
| 4,222,235 A | * | 9/1980 | Adamson et al. .......... | 60/226.1 |
| 5,320,305 A | * | 6/1994 | Oatway et al. ............ | 244/12.3 |

* cited by examiner

Primary Examiner—Louis J. Casaregola
(74) Attorney, Agent, or Firm—Harness Dickey & Pierce P.L.C.

(57) ABSTRACT

A turbofan jet engine having a housing and an engine core disposed in the housing. The engine core includes at least a compressor, turbine, and a drive shaft. The drive shaft defines a drive shaft axis. A plurality of fans are disposed in the housing and each is rotatable about a separate fan axis. Each of the fan axes are axially offset from the drive shaft axis. The turbofan jet engine further includes a drive system operably interconnecting the engine core and fans so as to rotatably drive the fans and selectively disengage select fans from the engine core.

7 Claims, 3 Drawing Sheets

HIGH BYPASS MULTI-FAN ENGINE

FIELD OF THE INVENTION

The present invention relates to bypass turbofan jet engines and, more particularly, relates to a high bypass-ratio turbofan jet engine having a plurality of non-coaxial fans.

BACKGROUND OF THE INVENTION

As is well known in the art, turbofan jet engines are often used for aircraft propulsion. The turbofan jet engines generally include a turbine section that is designed to drive at least one compressor and a bypass fan. The bypass fan is typically a low-pressure compressor of large diameter, which is disposed upstream of the main compressor. The bypass fan is further arranged in coaxial relationship with a drive shaft or spool powered by the turbine.

Despite the popularity and successfulness of today's turbofan jet engine, it is accurate to say that the current state-of-the-art in engine development is one of infinitesimally small improvements. Improvements in the art are often limited by the reluctance to modify such a successful design. However, in this regard it can be appreciated that there are structural limits imposed on today's turbofan designs in light of current material advancements.

By way of background, turbofan jet engines typically have a coaxial design in that the bypass fan, the compressor, and the turbine sections rotate about a common axis on two or three coaxial shafts or spools. It is generally accepted that by increasing the bypass fan diameter or employing counter-rotating fans, one can improve the bypass ratio and, thus, the turbofan jet engine efficiency. However, there are number of disadvantages associated with these design techniques. For example, by increasing the bypass fan diameter, the diameter of the nacelle is also increased. The increased size of the nacelle in turn increases the drag and weight associated with the nacelle and the support strut.

Furthermore, the increased nacelle diameter may also cause ground clearance problems leading to undesirable configuration characteristics. Any type of oversized engine configuration inhibits the engines use in vertical take-off and landing designs. Still further, large diameter bypass fans further require extensive shielding in the event of a blade-out so as to contain the blades within the engine housing, also known as blade containment. Such blade containment requires robust materials that add significant weight to the aircraft. Alternatively, the addition of counter-rotating fans increases the complexity of the turbofan jet engine and further increases the buzz-saw noise from the front of the engine, which is undesirable.

During operation of conventional turbofan jet engines, it is necessary to shut down the engine in the event of a failure of the bypass fan stage. During the shutdown process, due to the sheer size of the bypass fan, the engine experiences very high blade-out loads further necessitating the aforementioned blade containment shielding.

Although conventional turbofan jet engines are quite safe and reliable, the efficiency of the design and associated components have been maximized. That is, the size, arrangement, and materials used generally limit further major advancements in turbofan jet engine design. Accordingly, in order to provide improved engine efficiency, there exists a need in the relevant art to change from the basic coaxially arranged turbofan jet engine design.

SUMMARY OF THE INVENTION

According to the principles of the present invention, a turbofan jet engine having an advantageous design is provided. The turbofan jet engine includes a housing and an engine core disposed in the housing. The engine core includes at least a compressor, turbine, and a drive shaft. The drive shaft defines a drive shaft axis. A plurality of fans are disposed in the housing and each is rotatable about a separate fan axis. Each of the fan axes are axially offset from the drive shaft axis. The turbofan jet engine further includes a drive system operably interconnecting the engine core and fans so as to rotatably drive the fans and selectively disengage select fans from the engine core.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. In fact, it is anticipated that the principles of the present invention may be equally applicable to a wide variety of turbofan jet engines. Accordingly, the present invention will be described in connection with a conventional high bypass-ratio turbofan jet engine with the following differences described below. Therefore, in the interest of brevity, the specific components and operation of the engine core will not be described herein.

Figure 1:
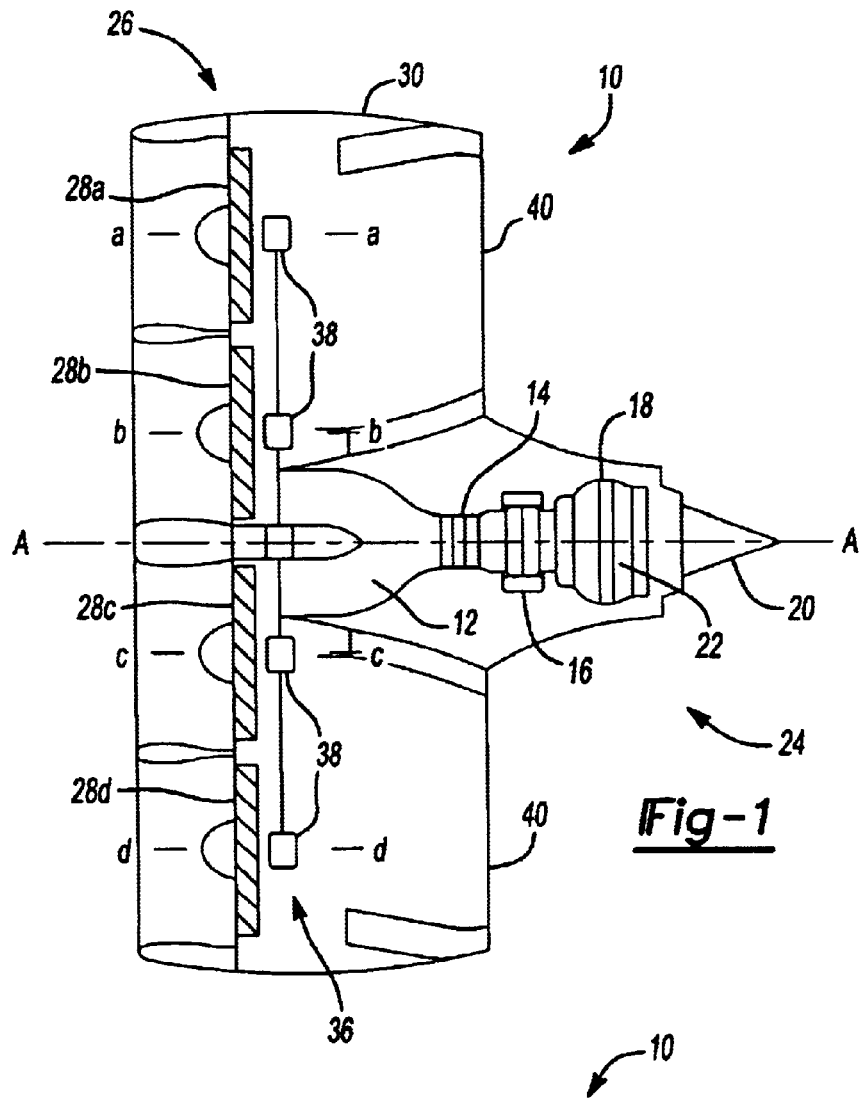
FIG. 1 is a plan view illustrating a high bypass multi-fan jet engine according to the principle of a first embodiment.
Figure 2:
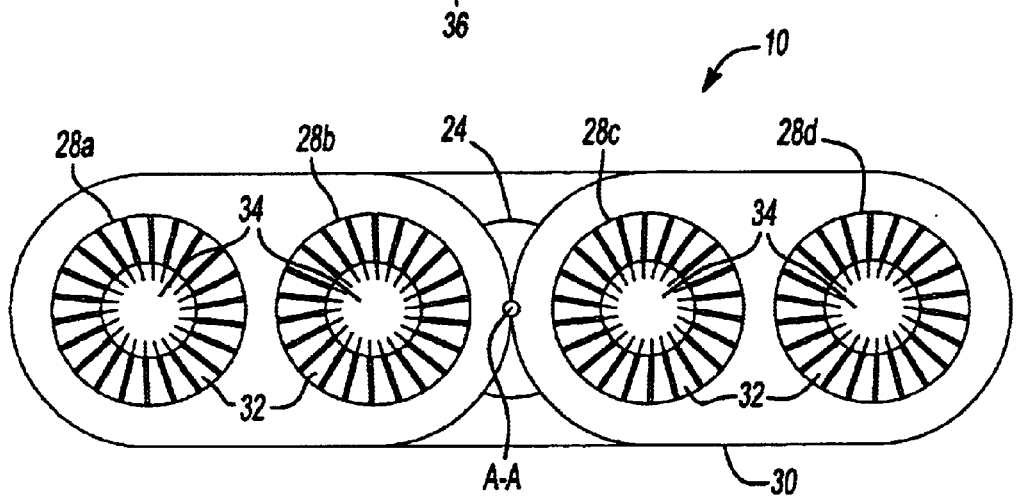
FIG. 2 is a front view illustrating the high bypass multi-fan jet engine according to the principle of a first embodiment.

As best seen in FIGS. 1 and 2, a high bypass multi-fan engine 10 is illustrated in accordance with the principles of the present invention. Briefly, engine 10 generally includes a diffuser 12 disposed upstream from a compressor 14, a combustor 16, a turbine 18, and a nozzle 20. As may be readily seen in FIG. 1, diffuser 12, compressor 14, combustor 16, turbine 18, and nozzle 20 are generally arranged in a coaxial arrangements about at least one shaft 22 extending along an axis A—A (hereinafter, these components are generally referred to as engine core 24). It should be appreciated that variations in design of the aforementioned components is to be regarded as being within the scope of the present invention. For example, it is common to use multistage compressors to generate the high bypass-ratios commonly associated with these designs.

Still referring to FIGS. 1 and 2, engine 10 further includes a fan stage 26 having a plurality of fans 28 disposed upstream from engine core 24. The plurality of fans 28 are disposed within a fan cowl and diffuser 30. Each of the plurality of fans 28 includes a plurality of fan blades 32 extending radially outward from a fan hub 34. Each of the plurality of fans 28 is adapted to rotate about an individual axis separate from the remaining plurality of fans 28. That is, fan 28a rotates about an axis a—a, fan 28b rotates about an axis b—b, fan 28c rotates about an axis c—c, and fan 28d rotates about an axis d—d (FIG. 1).

Each of the plurality of fans 28 is further driven using a gearbox drive system 36 operably coupled between shaft 22 and each of the plurality of fans 28. However, it should be understood that gearbox drive mechanism 36 may be operably coupled to additional shafts operating within the engine core 24 in order to balance the load requirements and/or provide redundant mechanisms in the event of a failure. According to a first embodiment, gearbox drive system 36 may include mechanical structure capable of transmitting the drive force between shaft 22 and fan hub 34. Alternatively, gearbox drive system 36 may include conduit to drive each of the plurality of fans 28 in response to bleed air from compressor 14.

Gearbox drive system 36 further includes a disengagement system 38 operably coupled to each of the plurality of fans 28 to permit the selective and discrete disengagement of any one of the plurality of fans 28 in the event of a failure. This arrangement permits engine 10 to continue to operate, albeit at a reduced efficiency, in emergencies. In a conventional turbofan jet engine, failure of the fan stage would necessitate the shutdown of the entire engine. However, according to the present invention, engine 10 may continue to operate.

As best seen in FIG. 1, fan cowl and diffuser 30 may include a plurality of fan flow exhausts 40 extending from a rearward end thereof. The fan flow exhausts 40 permit the flow of at least a portion of the air therethrough.

Figure 3:
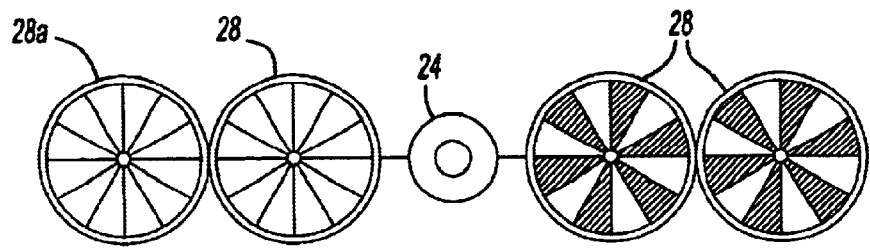
FIG. 3 is a front view illustrating the high bypass multi-fan jet engine according to the principle of a second embodiment.
Figure 4:
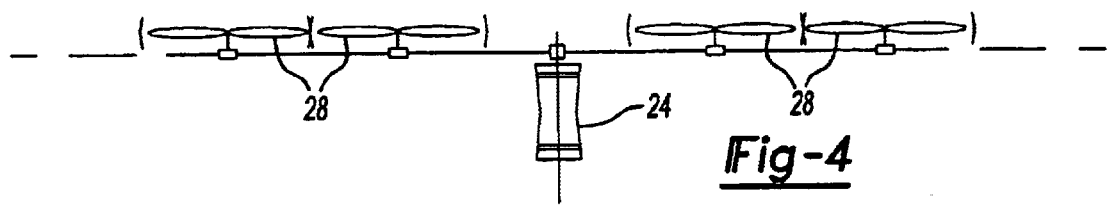
FIG. 4 is a plan view illustrating the high bypass multi-fan jet engine according to the principle of the second embodiment.
Figure 5:
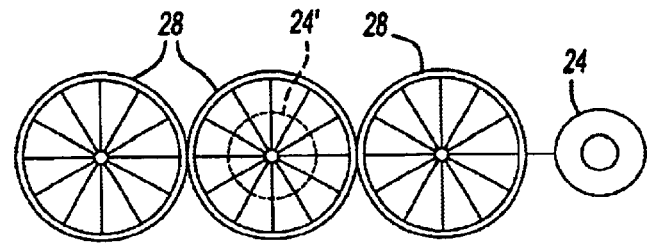
FIG. 5 is a front view illustrating the high bypass multi-fan jet engine according to the principle of a third embodiment.
Figure 6:
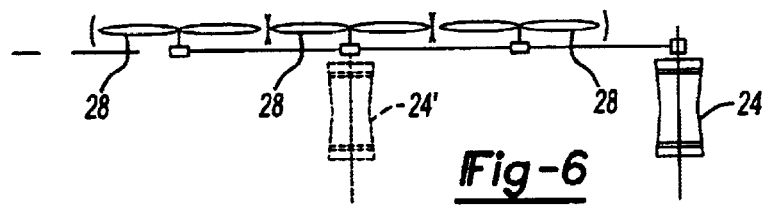
FIG. 6 is a plan view illustrating the high bypass multi-fan jet engine according to the principle of the third embodiment.
Figure 7:
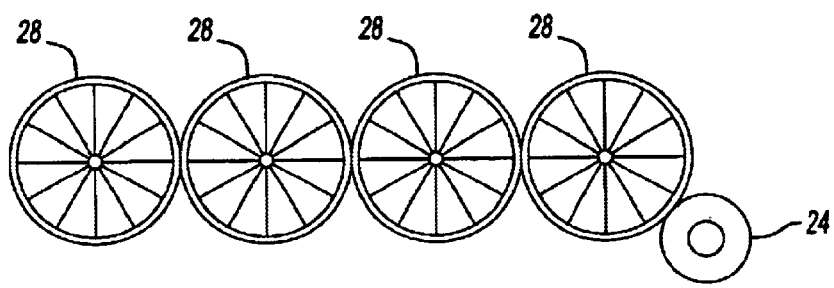
FIG. 7 is a front view illustrating the high bypass multi-fan jet engine according to the principle of a third embodiment.
Figure 8:
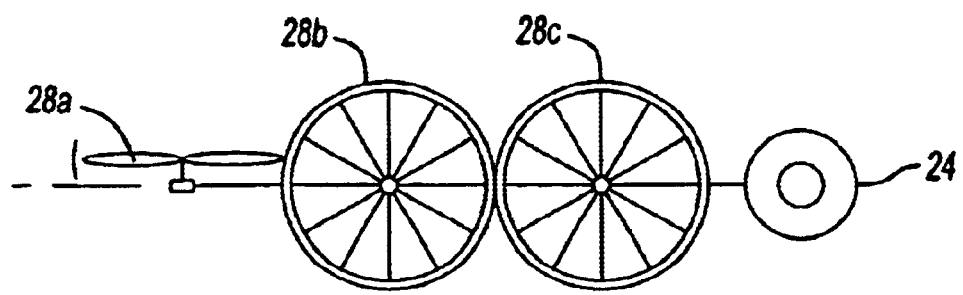
FIG. 8 is a front view illustrating the high bypass multi-fan jet engine according to the principle of a fourth embodiment.
Figure 9:
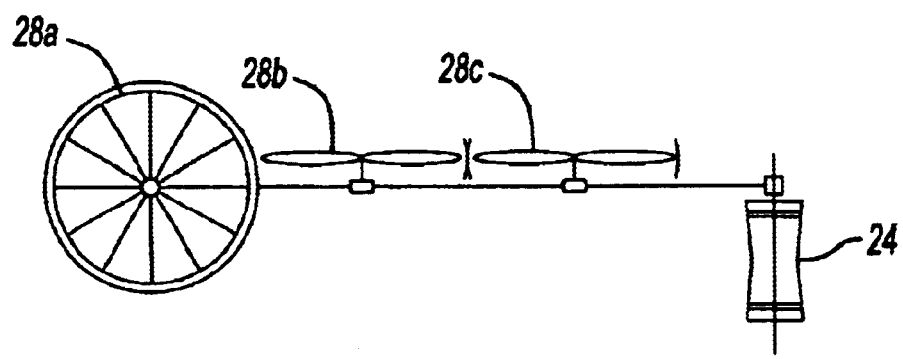
FIG. 9 is a plan view illustrating the high bypass multi-fan jet engine according to the principle of the fourth embodiment.

As should be appreciated from the foregoing, the plurality of fans 28 may be arranged in any one of a number of various configurations, which are tailored to the specific application. For example, as seen in FIGS. 3 and 4, the plurality of fans 28 may be arranged symmetrically about engine core 24. Alternatively, the plurality of fans 28 may be arranged asymmetrically or to one side of engine core 24 (FIGS. 5 and 6). Still further, the plurality of fans 28 may be further arranged such that axis A—A is offset from a plane extending through axes a—a, b—b, c—c, and d—d (FIG. 7). In fact, the axes of the plurality of fans 28 may be at any angle relative to each other as illustrated in FIGS. 8 and 9. For example, fan 28a may be directed in a direction 90 degrees relative to fans 28b and 28c. However, it should be readily appreciated that at least one of the plurality of fans 28 may be coaxially aligned with engine core 24, as illustrated in FIGS. 5 and 6 where core 24', shown in phantom, is coaxially aligned with the center fan 28.

As should be appreciated from the foregoing discussion and figures, each of the plurality of fans 28 is considerably smaller than a conventional single fan turbofan jet engine. As the fans become smaller, the stresses and the material demands are reduced, thereby the need for exotic materials may be relaxed. Furthermore, smaller fans also produce much smaller blade-out loads due to lower energy and lighter weight, therefore the robustness and weight of the associated blade containment system may be dramatically reduced. Such reduction in the robustness and weight of the blade containment system may provide substantial weight savings in the aircraft. Still further, smaller fans are more easily manufactured and transported in larger numbers, thus providing reduced manufacturing costs.

The high bypass multi-fan engine of the present invention provides many important advantages over conventional bypass turbofan jet engine designs. By way of non-limiting example, the present invention provides for the reduction of installation weight, operational noise production, improved range, improved payload capability, improved safety, improved design flexibility, and dramatically reduced manufacturing and operational costs. Additionally, the present invention provides a method of producing bypass ratios which are consistent with today's technology or those that can not be achieve solely with today's technology. By way of non-limiting example, the present invention can provide bypass ratios up to and great than 9:1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A turbofan jet engine comprising:

a cowl;

an engine having at least a compressor, turbine, and a drive shaft, said drive shaft defining a drive shaft axis;

a plurality of fans disposed in said cowl, each of said plurality of fans being rotatable about a corresponding fan axis, said fan axis of each of said plurality of fans being axially offset from said drive shaft axis; and a drive system operably interconnecting said engine core and said fans so as to rotatably drive said fans, said drive system being operable to selectively and independently disengage each of said plurality of fans from said drive shaft while simultaneously maintaining engagement of the remaining of said plurality of fans with said drive shaft.

2. The turbofan jet engine according to claim 1 wherein each of said plurality of fans includes a plurality of outwardly extending fan blades extending from a central hub.

3. The turbofan jet engine according to claim 1 wherein said drive system is a mechanical system.

4. A turbofan jet engine comprising:

a cowl;

an engine core having a compressor, a combustor, a turbine, and a drive shaft arranged in a coaxial relationship, said engine core driving said drive shaft about a drive shaft axis;

a fan stage having a plurality of fans disposed upstream from said engine core, said plurality of fans being disposed within said cowl, each of said plurality of fans having a plurality of fan blades radially extending outwardly from a fan hub and rotatable about a corresponding fan axis, said fan axis of each of the plurality of fans being axially offset from said drive shaft axis; and a drive system operably coupling said drive shaft of said engine core to said fan hub of each of said plurality of fans for rotatably driving each of said plurality of fans, said drive system being operable to independently disengage each of said plurality of fans from said drive shaft while simultaneously maintaining engagement of the remaining of said plurality of fans with said drive shaft.

5. The turbofan jet engine according to claim 4 wherein said drive system is a mechanical drive system.

6. The turbofan jet engine according to claim 4 wherein said drive system comprises conduit operably coupling a bleed air output of said compressor with each of said plurality of fans.

7. A turbofan jet engine comprising:

a cowl;

an engine core having a compressor, a combustor, a turbine, and a drive shaft arranged in a coaxial relationship, said engine core driving said drive shaft about a drive shaft axis;

a fan stage having a plurality of fans disposed upstream from said engine core, said plurality of fans being disposed within said cowl, each of said plurality of fans having a plurality of fan blades radially extending outwardly from a fan hub and rotatable about a corresponding fan axis said fan axis of each of the plurality of fans being axially offset from said drive shaft axis and a bleed air drive system operably coupling a bleed air output of said compressor of said engine core to said fan hub of each of said plurality of fans for rotatably driving each of said plurality of fans, said bleed air drive system being operable to independently disengage at least one of said plurality of fans from said bleed air output while simultaneously maintaining engagement of the remaining of said plurality of fans with said drive shaft.

* * * * *